United States Patent [19]
Inomata et al.

[11] Patent Number: 5,905,983
[45] Date of Patent: May 18, 1999

[54] MULTIMEDIA DATABASE MANAGEMENT SYSTEM AND ITS DATA MANIPULATION METHOD

[75] Inventors: Hirofumi Inomata, Tokyo; Shigeru Matsuzawa, Machida, both of Japan

[73] Assignee: Hitachi, Ltd., Tokyo, Japan

[21] Appl. No.: 08/877,561

[22] Filed: Jun. 17, 1997

[30] Foreign Application Priority Data

Jun. 20, 1996 [JP] Japan .................................. 8-180126

[51] Int. Cl.⁶ .................................................. G06F 17/30
[52] U.S. Cl. ............................................. 707/4; 707/104
[58] Field of Search ........................ 707/1–10, 100–104, 707/200–206; 345/328; 348/575; 364/283.3; 395/671, 182.17

[56] References Cited

U.S. PATENT DOCUMENTS 5,414,808  5/1995  Williams .................................. 345/328
5,701,480  12/1997  Raz ......................................... 395/671

OTHER PUBLICATIONS

"The Object Database Standard: ODMG–93", editied by R. G. G. Cattell, published by Morgan Kaufmann Publishers, San Mateo, California, 1994.

"The Object Database Standard: ODMG–93", Release 1.1, edited by R.G.G. Cattell, published by Kyoritsu Shuppan, 1994.

Setrag Khoshafian, "Object–Oriented Databases", published by John Wiley & Sons, Inc., no date.

Setrag Khoshafian, "Object–Oriented Databases", published by Kyoritsu Shuppan, no date.

*Primary Examiner*—Thomas G. Black
*Assistant Examiner*—Ruay Lian Ho
*Attorney, Agent, or Firm*—Antonelli, Terry, Stout & Kraus, LLP

[57] ABSTRACT

When a database server has retrieved an object of an object storage area to be subjected to retrieval in response to a database query requirement, it stores identification information of an object of a query result in an identification information area. The database server functions to generate an object containing its query condition and identification information referring to identification information of an object of the query result in the identification information area and register the object in the object storage area. On the basis of information of a new query condition, a database client requires the database server to retrieve an object containing a condition of a retrieve already conducted and its retrieval result. As a retrieval result, the database client receives a query result for the condition of a query already conducted squaring with the new query condition.

7 Claims, 16 Drawing Sheets

FIG. 6  EXPLANATION OF MANIPULATION OF VIRTURL VIDEOTAPE DECK SERVER

FIG. 7 EXPLANATION OF MOUNTING MANIPULATION OF VIRTUAL VIDEOTAPE ON VIRTUAL VIDEOTAPE DECK

FIG. 8  EXPLANATION OF MANIPULATION OF VIRTUAL VIDEO SWITCHER

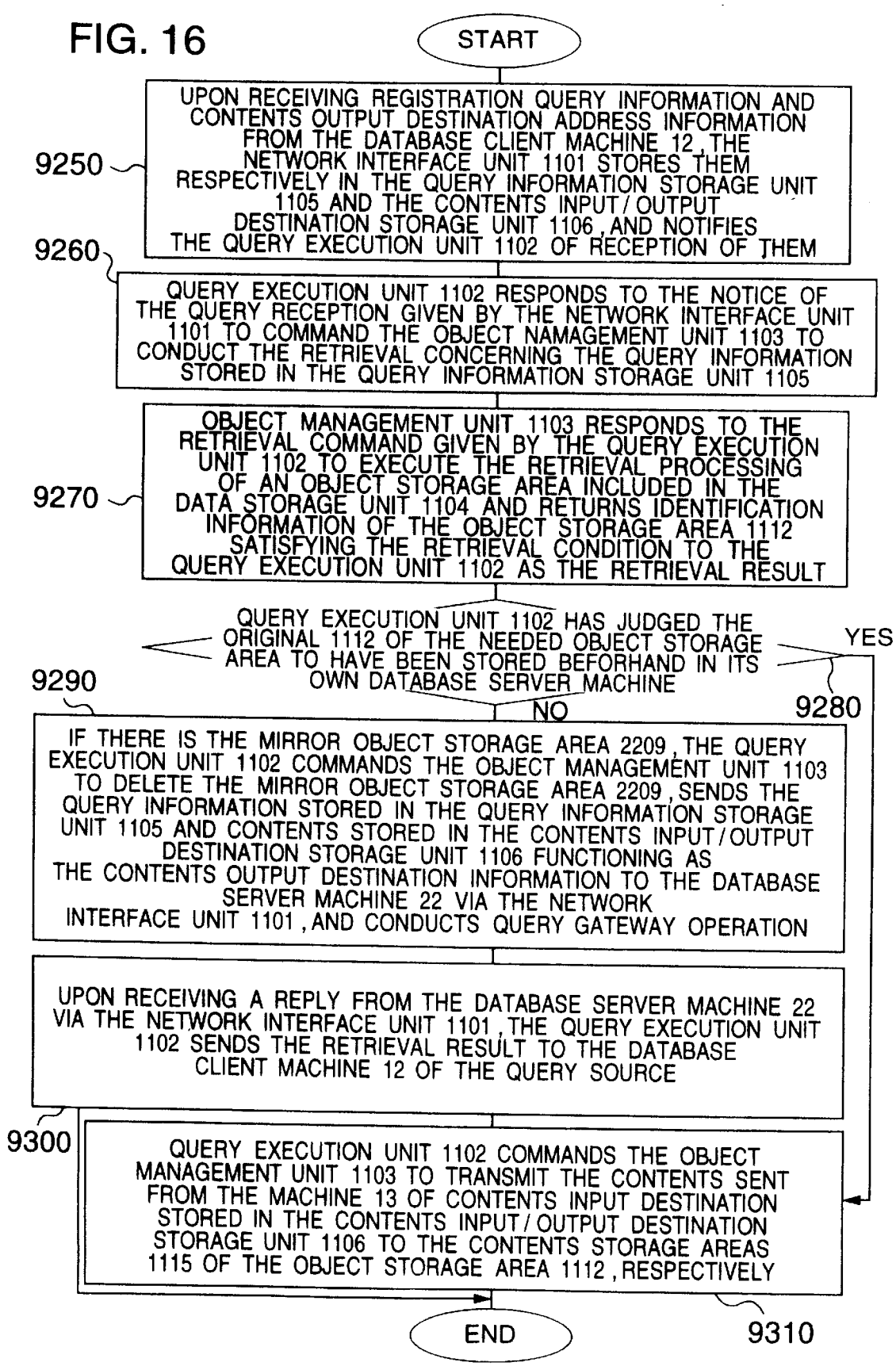

MULTIMEDIA DATABASE MANAGEMENT SYSTEM AND ITS DATA MANIPULATION METHOD

BACKGROUND OF THE INVENTION

The present invention relates to a database management system. In particular, the present invention relates to an object-oriented database management system handling multimedia data such as video data and audio data.

Conventional object-oriented database management systems are described in "The Object Database Standard: ODMG-93" edited by R.G.G. Cattell and published by Morgan Kaufmann Publishers, San Mateo, Calif., and "OBJECT-ORIENTED DATABASES" authored by Setrag Khoshafian and published by John Wiley & Sons, Inc., for example. In an object-oriented database management system, a collection having, as components, data to be subjected to database queries or identification data for referring to those data is defined as object, those objects stored in a nonvolatile storage such as a disk equipment are managed as a database. In the following description, components forming an object are referred to as "contents."

An object is defined as one belonging to a class declaring a configuration of the components.

Declaration of a class is conducted for a class name. For an object belonging to the class, one or more sets each having a type (such as an integer type or character type) of each component and a name identifying the component are declared.

In an object-oriented database management system, an object has identification information for uniquely specifying it. As this identification information, an address value of a storage area storing the object is used, for example.

Retrieval in an object-oriented database management system will now be described. For one or more objects belonging to a certain class, objects containing contents which satisfy given conditions are retrieved. Identification information of an object of a set having identification information of those objects as components is obtained as a.result of the retrieval.

The class to which the object of the set returned as the retrieval result belongs is a class declared as already known by the object-oriented database management system. In addition, its storage area is provided temporarily for each retrieval query.

Furthermore, in an object-oriented database management system having a configuration of a client server system, a database client machine issuing a query sends a query requirement to a database server machine which processes the query and the database server machine conducts processing and thereafter returns a result of the query to the database client machine which issued the query requirement.

SUMMARY OF THE INVENTION

A first problem of the conventional technique will now be described. In the database server machine, the retrieval result is only created temporarily as the object of the set or registered in the database as an object individually defined by the user, and then used. Consideration is not given to reuse of the retrieval result. Every time a query is required, high-load retrieval processing under similar retrieval conditions is conducted wastefully.

A second problem of the conventional technique will now be described. Upon a query requirement from a database client machine in the conventional database server machine, contents are transferred uniquely to a database client machine which has issued that query requirement. In the case where the contents contain data such as video data needing a special input/output equipment, therefore, the user cannot handle the contents in a database client machine having no such an equipment.

In order to eliminate the above described problems, the present invention provides a multimedia database management system including at least one database client machine whereby a user inputs a database query requirement and at least one database server machine storing and managing a collection of data to be subjected to processing of a database query requirement and identification information functioning as data for referring to the data in a database as an object, the database server machine functioning to return identification information of an object containing data satisfying a query condition to the database client machine in response to processing of a database query requirement set out by the database client machine, at least one database client machine being connected to at least one database server machine via a communication network, in which the database server machine includes means for generating an object containing contents of a database query requirement and a query result at the time of processing a database query requirement and for registering the object in the database, and the database client machine includes means responsive to information of a new query requirement to require the database server machine to retrieve an object containing contents of a database query requirement already conducted and its query result and receive a query result for a database query requirement already conducted squaring with the information of the new query requirement as a query result.

Furthermore, in accordance with the present invention, a multimedia database management system includes a communication network, at least one database client machine connected to the communication network, a database query requirement being inputted to the database client machine by a user, at least one database server machine connected to the communication network, the database server machine storing and managing at least one collection of data to be subjected to processing of a database query requirement received from the database client machine, and at least one contents input/output client machine connected to the communication network to receive data obtained as a result of the processing of the database query requirement from the database server machine and convert the data to a reproduced signal to be outputted to an output equipment.

Furthermore, in accordance with the present invention, a multimedia database management system includes a communication network, at least one database client machine connected to the communication network, a database query requirement being inputted to the database client machine by a user, at least one database server machine connected to the communication network, the database server machine storing and managing at least one collection of data to be subjected to processing of a database query requirement, and at least one contents input/output client machine connected to the communication network, the contents input/output client machine converting an input signal inputted from an input equipment so as to be stored in the database server machine to data of such a form as to be stored in the database server machine and transmitting resultant data to the database server machine.

Furthermore, in accordance with the present invention, a multimedia database management system includes a communication network, at least one database client machine connected to the communication network, a database query requirement being inputted to the database client machine by a user, at least one database server machine connected to the communication network, the database server machine storing and managing at least one collection of data to be subjected to processing of a database query requirement, and at least one contents input/output client machine connected to the communication network to receive data obtained as a result of the processing of the database query requirement from the database server machine and convert the data to a reproduced signal to be outputted to an output equipment, the contents input/output client machine converting an input signal inputted from an input equipment so as to be stored in the database server machine to data of such a form as to be stored in the database server machine and transmitting resultant data to the database server machine.

Furthermore, the present invention provides a multimedia database management system including at least one database client machine whereby a user inputs a database query requirement and at least one database server machine storing and managing at least one collection of data to be subjected to processing of the database query requirement and data for referring to the data in a database as an object, the database server machine functioning to return identification information of an object containing data satisfying a query condition to the database client machine at the time of processing of a database query requirement from the database client machine, at least one database client machine being connected to at least one database server machine via a communication network, the multimedia database management system including a contents input/output client machine connected to the database server machine via the communication network, an input/output equipment connected to the contents input/output client machine, the multimedia database management system further including means responsive to reception, from the database server machine, of a transmission requirement of data contained in an object of a retrieval result or data contained in an object to be registered, to send and receive the data from the database server machine to the input/output equipment or from the input/output equipment to the database server machine, means provided in the database client machine so as to function to send a machine address of the contents input/output client machine whereto data of a retrieval result should be transmitted or a machine address of the contents input/output client machine which should transmit data to be registered to the database server machine, to the database server machine together with a database query or a registration requirement, and means provided in the database server machine so as to function to send the transmission requirement of a result of processing of a database query requirement or data to be registered into the database to the contents input/output client machine indicated by the machine address sent from the database client machine, and send/receive the data to/from the contents input/output client machine.

BRIEF DESCRIPTION OF THE DRAWING

FIG. 16 is a diagram showing a flow chart of registration gateway operation of a database server machine 11.

DESCRIPTION OF THE PREFERRED EMBODIMENTS

A preferred embodiment of the present invention will now be described by referring to FIGS. 1 through 3 and FIGS. 9 through 16.

(a) Components of System

Figure 1:
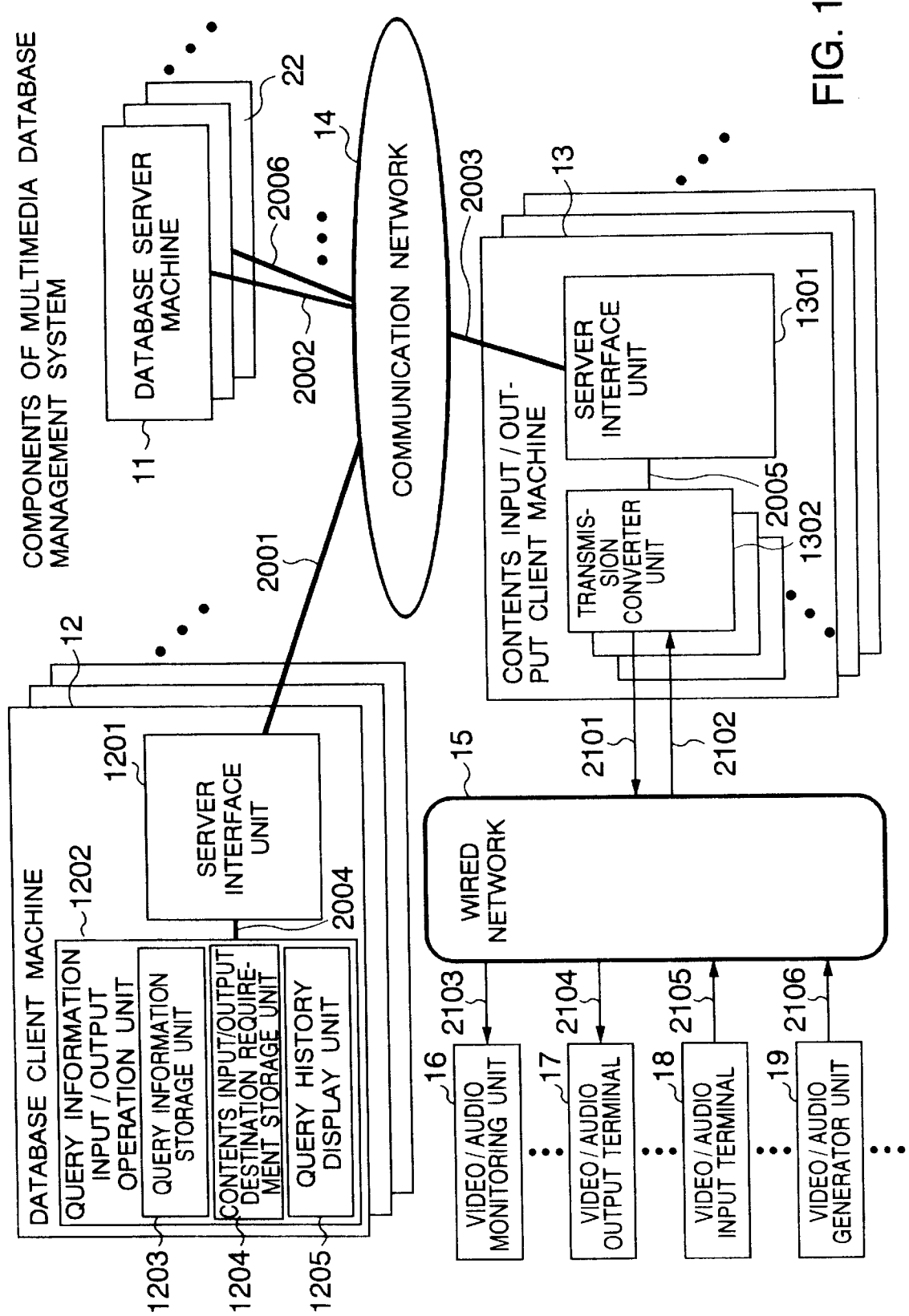
FIG. 1 is a diagram showing components of a multimedia database management system.

Components of the present multimedia database management system will now be described by referring to FIGS. 1 through 3. The present system includes a plurality of database client machines 12, a plurality of database server machines 11 and 22, a plurality of contents input/output client machines 13, a communication network 14, a plurality of video/audio monitoring units 16, a plurality of video/audio output terminals 17, a plurality of video/audio input terminals 18, a plurality of video/audio generator units 19, and a wired network 15.

Hereafter, components of each machine will now be described.

The database client machine 12 will now be described by referring to FIG. 1.

The database client machine 12 includes a server interface unit 1201 connected to a communication network 14 via a data path 2001 and a query information input/output operation unit 1202 connected to the server interface unit 1201 via a data path 2004.

The query information input/output operation unit 1202 includes a query information storage unit 1203, a contents input/output destination requirement storage unit 1204, and a query history display unit 1205.

The query information input/output operation unit 1202 is a module functioning as a man-machine interface. Thereby, the user inputs a database query requirement, and the processing status of a query requirement and the history are displayed for the user. Furthermore, the query information input/output operation unit 1202 is a module functioning to issue a command to the server interface unit 1201 to transmit the query requirement of the user to the database server machine 11.

The query information storage unit 1203 is a memory for storing the information of the query requirement received from the user by the query information input/output operation unit 1202.

The contents input/output destination requirement storage unit 1204 is a memory for storing address information of a machine of contents input/output destination included in the information received from the user by the query information input/output operation unit 1202.

For the purpose of explanation, it is hereafter assumed that the user specifies the address information of a contents input/output client server 13, and its address information is stored in the contents input/output destination requirement storage unit 1204 as an example.

The query history display unit 1205 is a display unit for displaying the requirement received from the user by the query information input/output operation unit 1202 and displaying a reply returned from the data base server machine 12 in response to the requirement.

Even if the user selects contents to be displayed on the display unit with a pointing device such as a mouse and the query information input/output operation unit 1202 stores the contents in the query information storage unit 1203 as a new query requirement, there is no harm at all in embodying the present invention.

The server interface unit 1201 is a module responsive to a command given by the query information input/output operation unit 1202 to send the query requirement received from the user and the address of the contents input/output destination to a database server machine 11 via the communication network 14 and function to send a reply to the requirement sent from the database server machine to the query information input/output operation unit 1202.

The database server machine 11 will now be described by referring to FIG. 2.

Each database server machine 11 includes a network interface unit 1101, a query execution unit 1102, an object management unit 1103, a data storage unit 1104, a data path 2002 for connecting the communication network 14 to the network interface unit 1101, a data path 1125 for connecting the network interface unit 1101 and the query execution unit 1102 to the object management unit 1103, and a data path 1126 for connecting the object management unit 1103 to the data storage unit 1104.

The network interface unit 1101 is a module having a query information storage unit 1105 and a contents input/output destination storage unit 1106 and functioning as an interface with respect to the communication network 14.

The query information storage unit 1105 is a memory for storing a query requirement received from the database client machine 12 via the communication network 14.

The contents input/output destination storage unit 1106 is a memory for storing the contents input/output destination address received from the database client machine 12 via the communication network 14.

The query execution unit 1102 is a processor module for executing processing of a query.

The object management unit 1103 is a module managing storage areas of objects stored in the data storage unit 1104 and having an object deleting unit 1107, an object transmission unit 1108, an object register unit 1109, and an object retrieval unit 1110.

The object register unit 1109 is a program code for securing an area storing a specified object in the data storage unit 1104.

The object retrieval unit 1110 is a program code for retrieving an object stored in the data storage unit 1104 and returning a identification information list of objects satisfying specified retrieval conditions.

The object transmission unit 1108 is a program code for mutually transmitting the entire contents or partial contents of a specified object stored in the data storage unit 1104 with a specified machine via the network interface unit 1101.

The object deleting unit 1107 is a program code for deleting the storage area of a specified object.

The data storage unit 1104 is a mass storage, such as a disk equipment, for storing objects.

An object is stored in an object storage area provided in the data storage unit 1104. In the data storage unit 1104, a plurality of object storage areas are secured. Objects stored in those object storage areas become subjects of queries.

Figure 2:
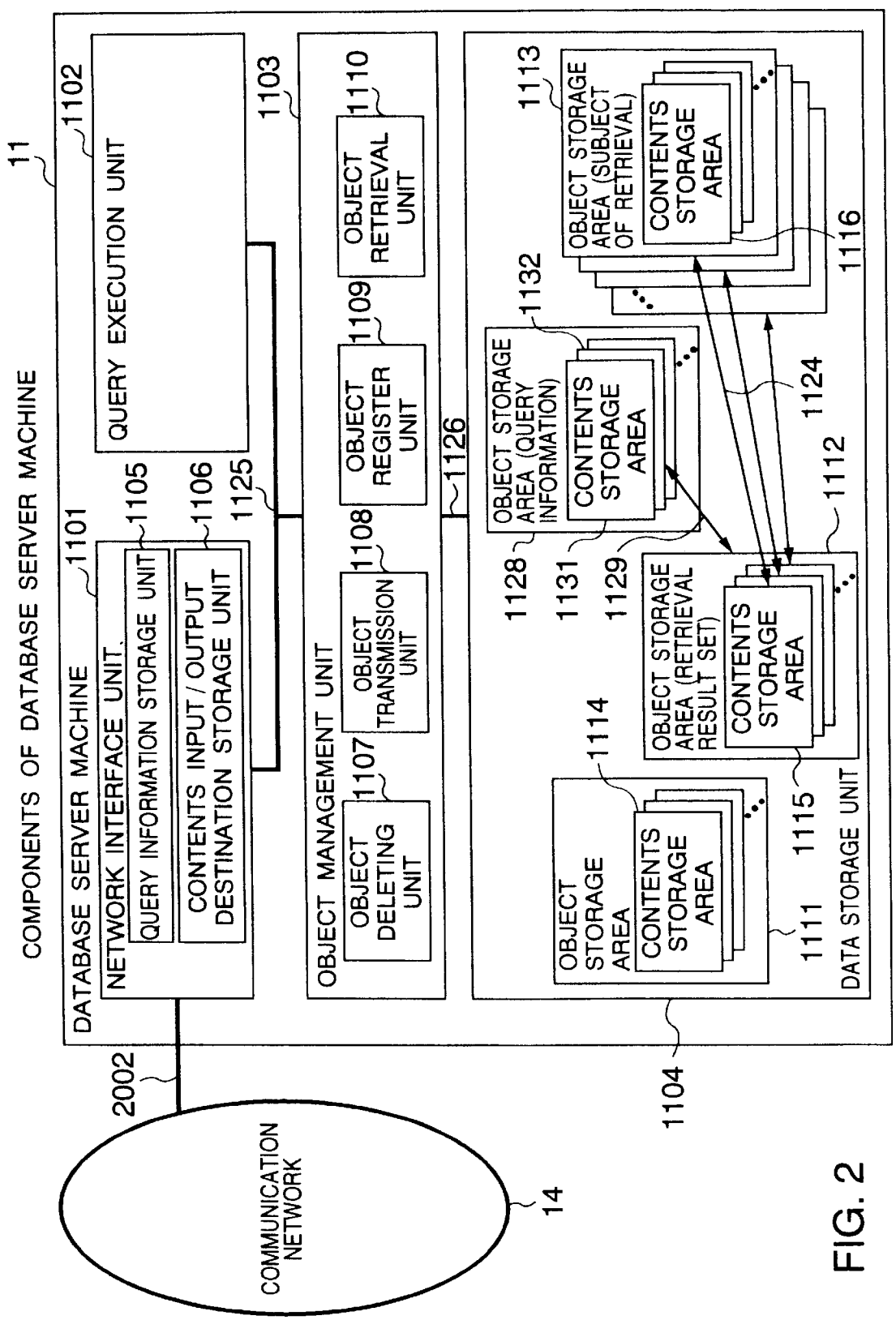
FIG. 2 is a diagram showing components of a database server machine.

For explaining the operation of retrieval and register, FIG. 2 illustrates such a state that mutually related objects are stored by way of example.

Relations among objects of FIG. 2 are shown as an example. Even if the relations are different, there is no harm in embodying the present invention. Because implementation is possible by using similar operations so long as relations are given.

An example of storage of objects in the data storage unit 1104 will now be described.

An object stored in the object storage area 1113 is one of objects which become subjects of retrieval of the object retrieval unit 1110. One or more such objects are stored in the data storage unit 1104.

Each object storage area includes at least one contents storage area each storing contents which are contents data of an object. For example, the object storage area 1113 includes contents storage areas 1116.

For the purpose of explanation, it is now assumed that contents satisfying the retrieval conditions for a query from the user are already stored in the contents storage area 1113.

The object storage area 1128 is an example of an object storing, as its contents, information of a query requirement from the user received by the database server machine and an identifier of an object storage area 1112 of its query result (including identifiers).

A contents storage area 1131 stores information of a query requirement from the user received by the database server machine.

A contents storage area 1132 stores information for referring to an object storage area storing a query result for a query requirement from the user received by the database server machine (i.e., identifier of an object storage area storing the query result).

Here, the identifier of the object storage area storing the query result need only be information uniquely a identifying an object, and it may be a pointer such as a serial number, or a certain address value of the storage area.

In the case where the multimedia database management system includes a plurality of database server machines, however, it is necessary that identification information is not duplicate between database server machines. The duplication may be avoided by adding identification information of the database server machine itself to information provided in respective database server machines, for example.

In FIG. 2, a relation 1129 indicates a contents storage area 1132 on one side and an object storage area 1112 storing a query result on the other side. This schematically shows that the identifier of the object storage area storing the query result is stored in that contents storage area 1132.

Even if an object referred to by another object has information for referring to the referring object, there is no harm at all in embodying the present invention.

In the object storage area 1112, retrieval results supplied from the object retrieval unit 1110 are stored as contents.

For example, in a contents storage area 1115, information (identifier) for referring to the object storage area 1113 of an object satisfying retrieval conditions is stored as contents. In an object storage area 1111 (similar to the object storage area 1113), newly registered objects are stored. The object storage area 1111 has contents storage areas 1114.

Components of the contents input/output client machine 13 will now be described by referring to FIG. 1.

The contents input/output client machine 13 includes a server interface unit 1301 and at least one transmission converter unit 1302.

The server interface unit 1301 is a module responsive to a command given by the database server machine to function to intercede in data transmission with respect to the transmission converter unit 1302 via the communication network 14.

The transmission converter unit 1302 is a module functioning to convert data sent from the server interface unit 1301 to a signal of a standard specified for each transmission converter and output the resultant signal, and functioning to convert a signal on a signal line 2102 to data to be sent to the database server machine and send the resultant data to the server interface unit 1301.

The transmission converter unit is an analog/digital converter or a digital/analog converter, for example. Data stored in the database server machine are generally represented by a digital code. Therefore, the transmission converter unit need only be a module for effecting conversion between a signal standard needed by the user and the digital code.

The transmission converter unit is connected to a user input/output unit such as a video/audio monitoring unit 16, a video/audio output terminal 17, a video/audio input terminal 18, or a video/audio generator unit 19 via the wired network 15.

As for the communication network 14, there is no harm at all in embodying the present invention so long as it is a network capable of conducting communication between computers, such as an Ethernet, an FDDI network, or an ATM network connecting a plurality of computers.

This communication network 14 connects the machines 12, 11, 22 and 13 to each other.

As for the video/audio monitoring unit 16, there is no harm at all in embodying the present invention so long as it is a unit for displaying signals in a form which can be recognized by a human such as a TV monitor displaying an NTSC video signal or a monitor speaker reproducing an audio signal.

Furthermore, the video/audio monitoring unit 16 is connected to the wired network 15 via a signal line 2103.

The video/audio output terminal 17 and the video/audio input terminal 18 are terminal equipments for connection to an external equipment.

The external equipments are a video audio equipment such as a videotape deck and a video mixing effect amplifier, for example.

The video/audio output terminal 17 and the video/audio input terminal 18 are connected to the wired network 15 via signal lines 2104 and 2105, respectively.

The video/audio generator unit 19 is a computer for generating computer graphics, equipments for generating title images, an effect sound generator, a synthesizer, etc., for example.

The video/audio generator unit 19 is connected to the wired network 15 via a signal line 2106.

The wired network 15 is wiring connecting signal lines 2101 to 2106 pulled out from respective machines and units so as to effect one-to-one connection.

(1) Explanation of Operation

Components of the database server machine 22 will now be described by referring to FIG. 3.

The database server machine 22 has components equivalent to those of the database server machine 11.

Figure 3:
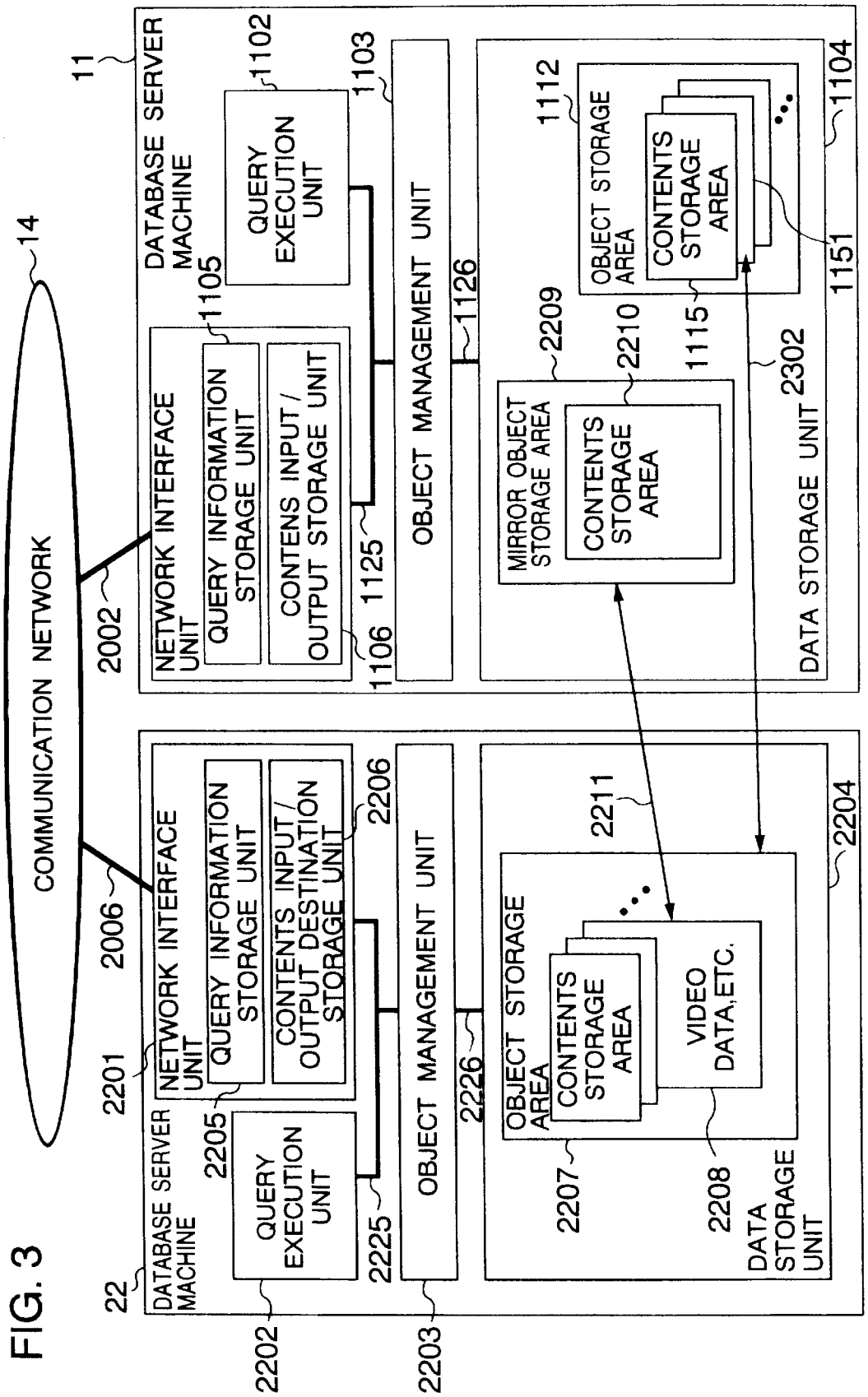
FIG. 3 is a diagram showing components of distributed storage of the objects.

However, FIG. 3 shows an example of the case where objects are related over a plurality of database server machines. Therefore, components of object storage areas stored in the data storage unit 1104 and the data storage unit 2204 differ from those of FIG. 2.

In a contents storage area 1151 of an object storage unit 1112, information (identifier) for referring to an object storage area 2207 is already stored.

The object storage area 2207 is an object storage area including a contents storage area 2208 storing contents such as actually handled video data. This is illustrated as a relation 2302.

A mirror object storage area 2209 is an object storage area storing a copy of contents of the object storage area 2207. This is illustrated as a relation 2211.

(a) Explanation of Retrieval Operation

First of all, by using a retrieval condition itself to be retrieved thereafter as the retrieval condition, an end user usually causes retrieval in one or more contents storage areas 1131 of the object storage area 1128 storing retrieval conditions used before.

If as a result a "retrieval condition used before" is found, then an identifier of an object storage area storing the retrieval result corresponding to that retrieval condition is derived from the contents storage area 1132. On the basis of this identifier, the retrieval result obtained by retrieval already conducted is derived from the contents storage area 1115 of the object storage area 1112.

If a "retrieval condition used before" is not found in the above described retrieval, then retrieval is conducted in the object storage area (subject of retrieval) 1113 storing net contents.

Retrieval in the object storage area (subject of retrieval) 1113 storing the net contents will now be described.

Figure 9:
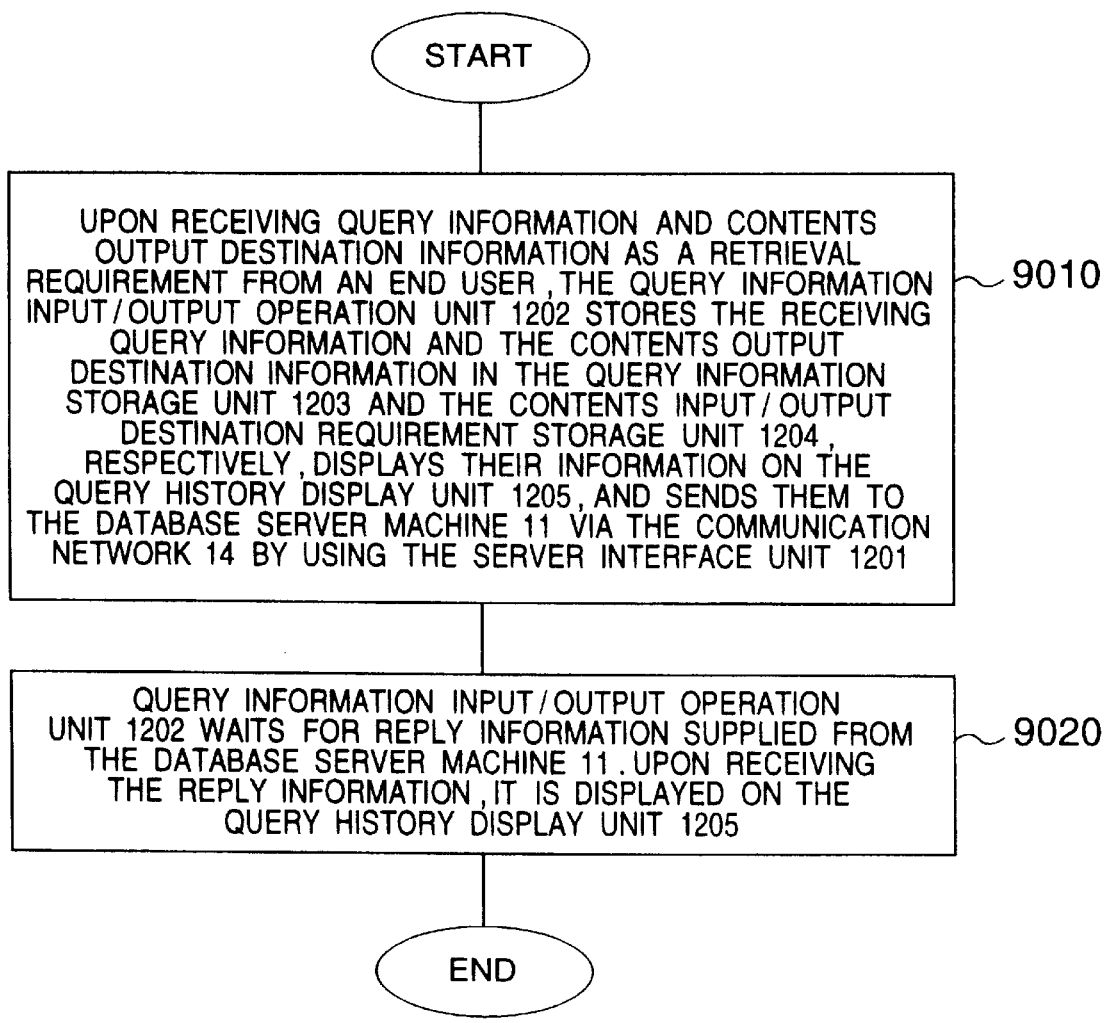
FIG. 9 is a diagram showing a flow chart of retrieval operation of a database client machine 12.

Retrieval operation of the database client machine 12 will now be described by referring to FIG. 9.

First of all, the retrieval operation is started from an operation block 9010.

Upon receiving query information and contents output destination address information as a query requirement from an end user in the operation block 9010, they are stored in the query information storage unit 1203 and the contents input/output destination requirement storage unit 1204, respectively. Their information is displayed on the query history display unit 1205 and sent to the database server machine 11 via the communication network 14 by the server interface unit 1201. Then operation of an operation block 9020 is started.

In the block 9020, reply information supplied from the database server machine 11 is waited for. Upon receiving the reply information, it is displayed on the query history display unit 1205 and the retrieval operation is finished.

Figure 10:
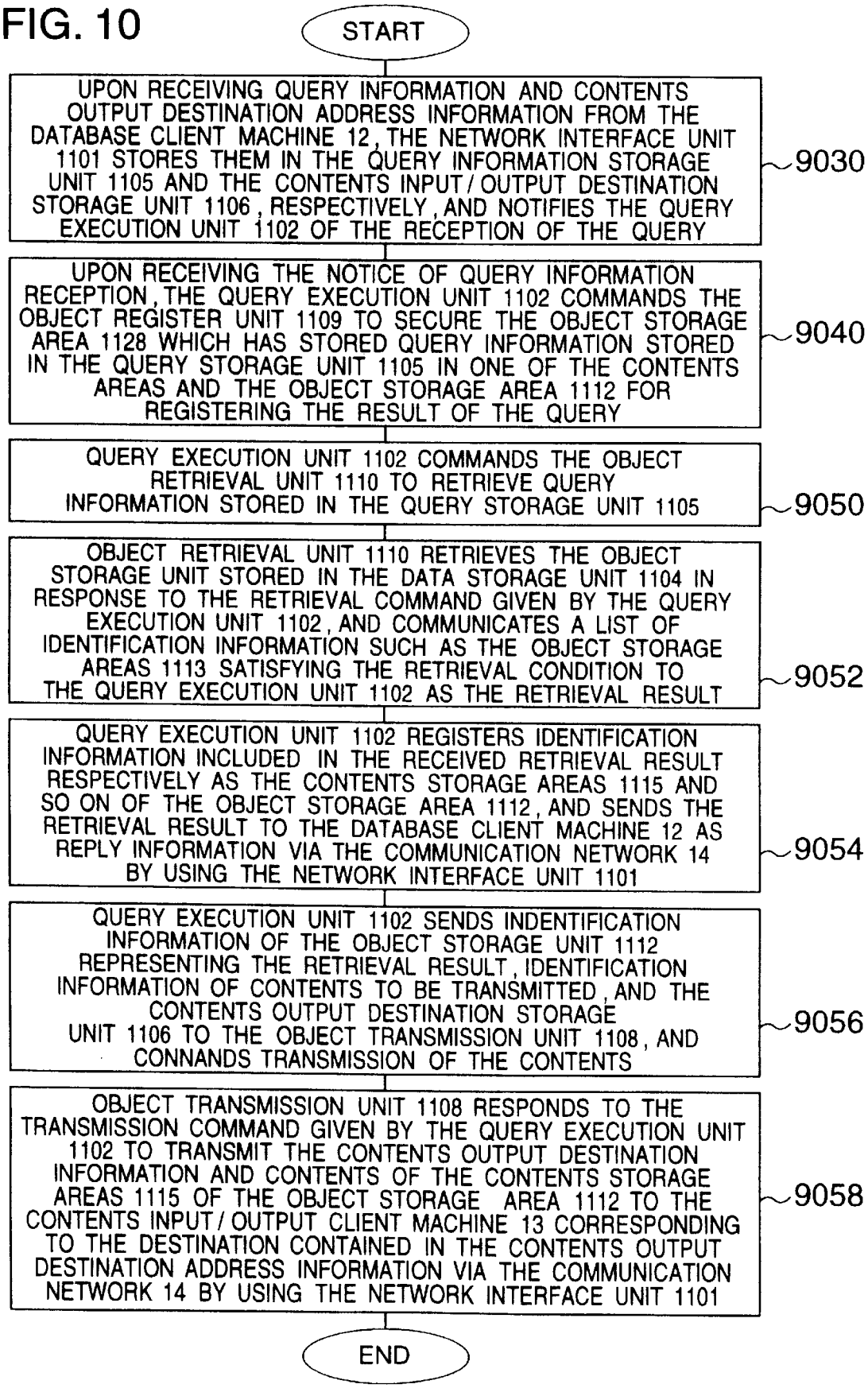
FIG. 10 is a diagram showing a flow chart of retrieval operation of a database server machine 11.

Retrieval operation of the database server machine 11 will now be described by referring to FIG. 10.

First of all, the retrieval operation is started from an operation block 9030.

Upon receiving query information and contents output destination address information from the database client machine 12 in the operation block 9030, the network interface unit 1101 stores the query information and the contents output destination address information in the query information storage unit 1105 and the contents input/output destination storage unit 1106, respectively, notifies the query execution unit 1102 of the reception of the query, and enters operation of an operation block 9040.

Upon receiving the notice of query information reception in the operation block 9040, the query execution unit 1102 commands the object register unit 1109 to secure the object storage area 1128 which has stored query information stored in the query storage unit 1105 in one of the contents areas and the object storage area 1112 for registering the result of the query, and enters operation of an operation block 9050.

In the operation block 9050, the query execution unit 1102 commands the object retrieval unit 1110 to retrieve query information stored in the query storage unit 1105. Then the query execution unit 1102 enters operation of an operation block 9052.

In the operation block 9052, the object retrieval unit 1110 retrieves the object storage unit stored in the data storage unit 1104 in response to the retrieval command given by the query execution unit 1102, and communicates a list of identification information such as the object storage areas 1113 satisfying the retrieval condition to the query execution unit 1102 as the retrieval result. Then the object retrieval unit 1110 enters operation of an operation block 9054.

In the operation block 9054, the query execution unit 1102 registers identification information included in the received retrieval result respectively as the contents storage areas 1115 and so on of the object storage area 1112, and sends the retrieval result to the database client machine 12 as reply information via the communication network 14 by using the network interface unit 1101. Then the query execution unit 1102 enters operation of an operation block 9056.

In the operation block 9056, the query execution unit 1102 sends identification information of the object storage unit 1112 representing the retrieval result, identification information of contents to be transmitted, and the contents output destination information stored in the contents output destination storage unit 1106 to the object transmission unit 1108, and commands transmission of the contents. Then operation of an operation block 9058 is started.

In the operation block 9058, the object transmission unit 1108 responds to the transmission command given by the query execution unit 1102 to transmit the contents output destination information and contents of the contents storage areas 1115 of the object storage area 1112 to the contents input/output client machine 13 corresponding to the destination contained in the contents output destination address information via the communication network 14 by using the network interface unit 1101. The retrieval operation is thus finished.

Figure 11:
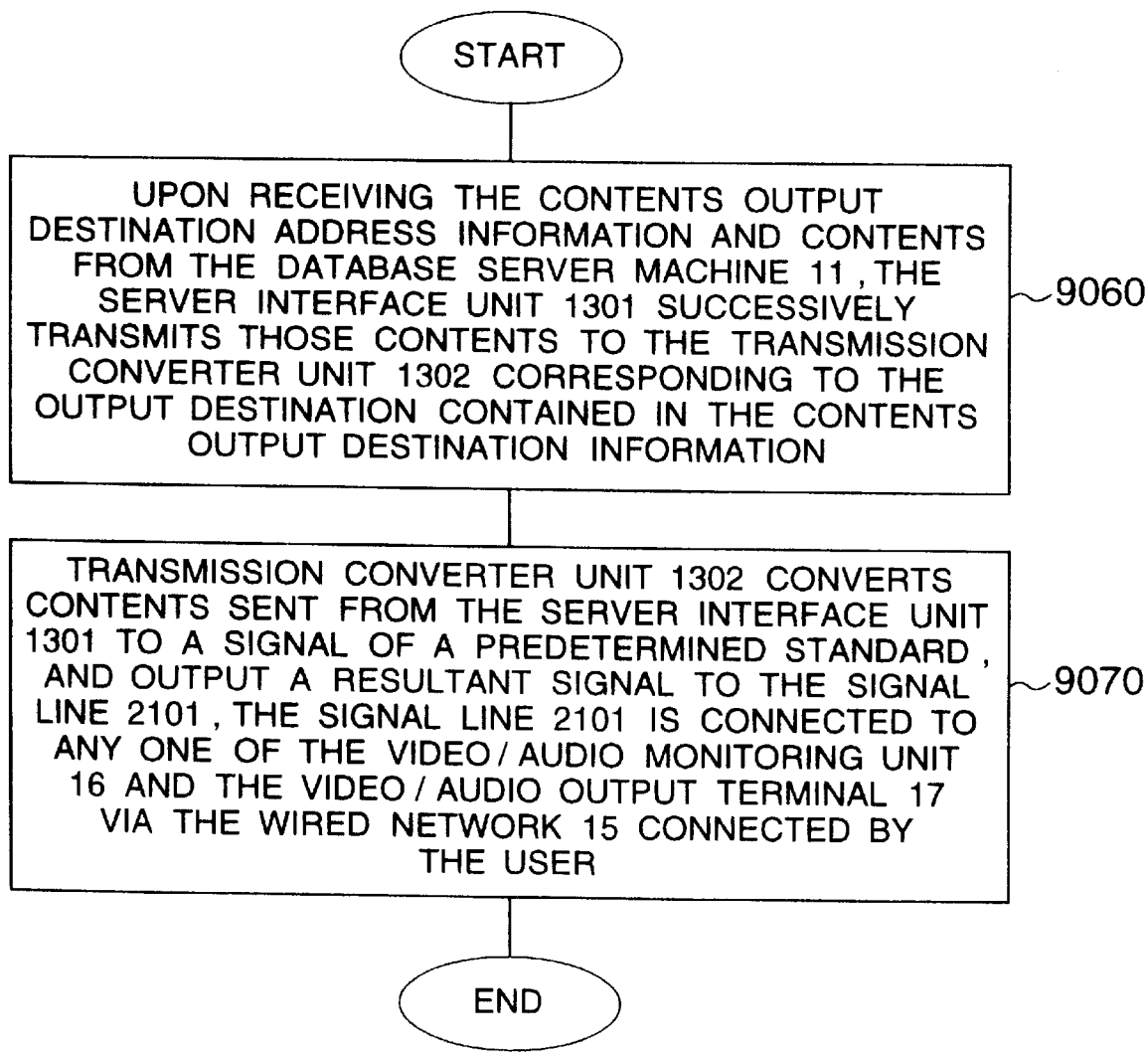
FIG. 11 is a diagram showing a flow chart of retrieval operation of a contents input/output client machine 13.

The retrieval operation of the contents input/output client machine 13 will now be described by referring to FIG. 11.

First of all, the retrieval operation is started from an operation block 9060.

Upon receiving the contents output destination address information and contents from the database server machine 11 in the operation block 9060, the server interface unit 1301 successively transmits those contents to the transmission converter unit 1302 corresponding to the output destination contained in the contents output destination information. Then operation of an operation block 9070 is started.

In the operation block 9070, the transmission converter unit 1302 converts contents sent from the server interface unit 1301 to a signal of a predetermined standard, and outputs a resultant signal to the signal line 2101. The retrieval operation is thus finished.

The signal line 2101 is connected to any one of the output units of the user's side, i.e., the video/audio monitoring unit 16 and the video/audio output terminal 17 via the wired network 15 connected by the user.

(b) Explanation of Registration Operation

Figure 12:
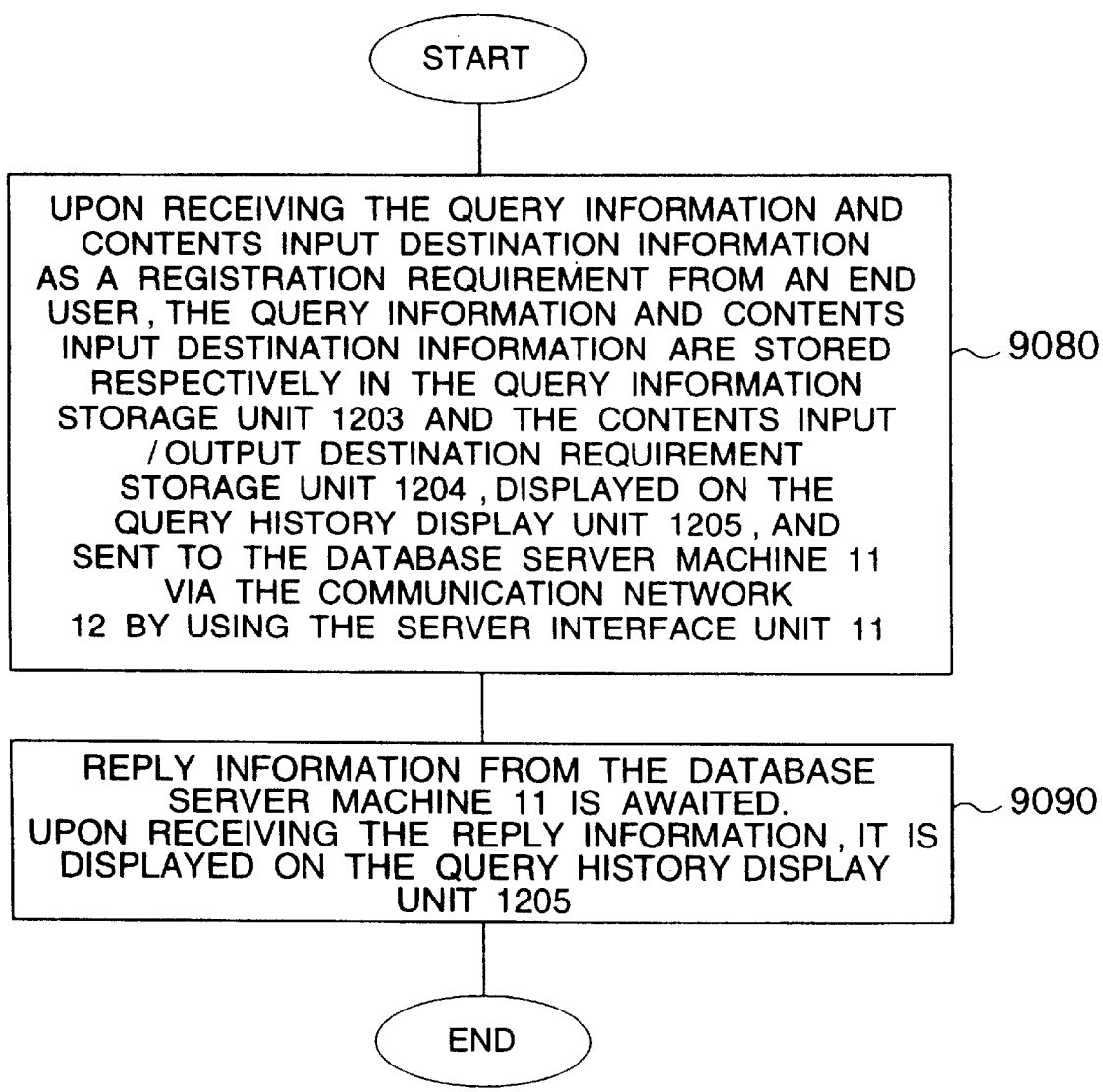
FIG. 12 is a diagram showing a flow chart of registration operation of a database client machine 12.

Registration operation of the database client machine 12 will now be described by referring to FIG. 12.

First of all, registration operation is started from an operation block 9080.

Upon receiving the query information and contents input destination information as a registration requirement from an end user in the operation block 9080, the query information and contents input destination information are stored respectively in the query information storage unit 1203 and the contents input/output destination requirement storage unit 1204, displayed on the query history display unit 1205, and sent to the database server machine 11 via the communication network 12 by using the server interface unit 1201. Then operation of an operation block 9090 is started.

In the operation block 9090, reply information from the database server machine 11 is waited for. Upon receiving the reply information, it is displayed on the query history display unit 1205. The registration operation is thus finished.

Figure 13:
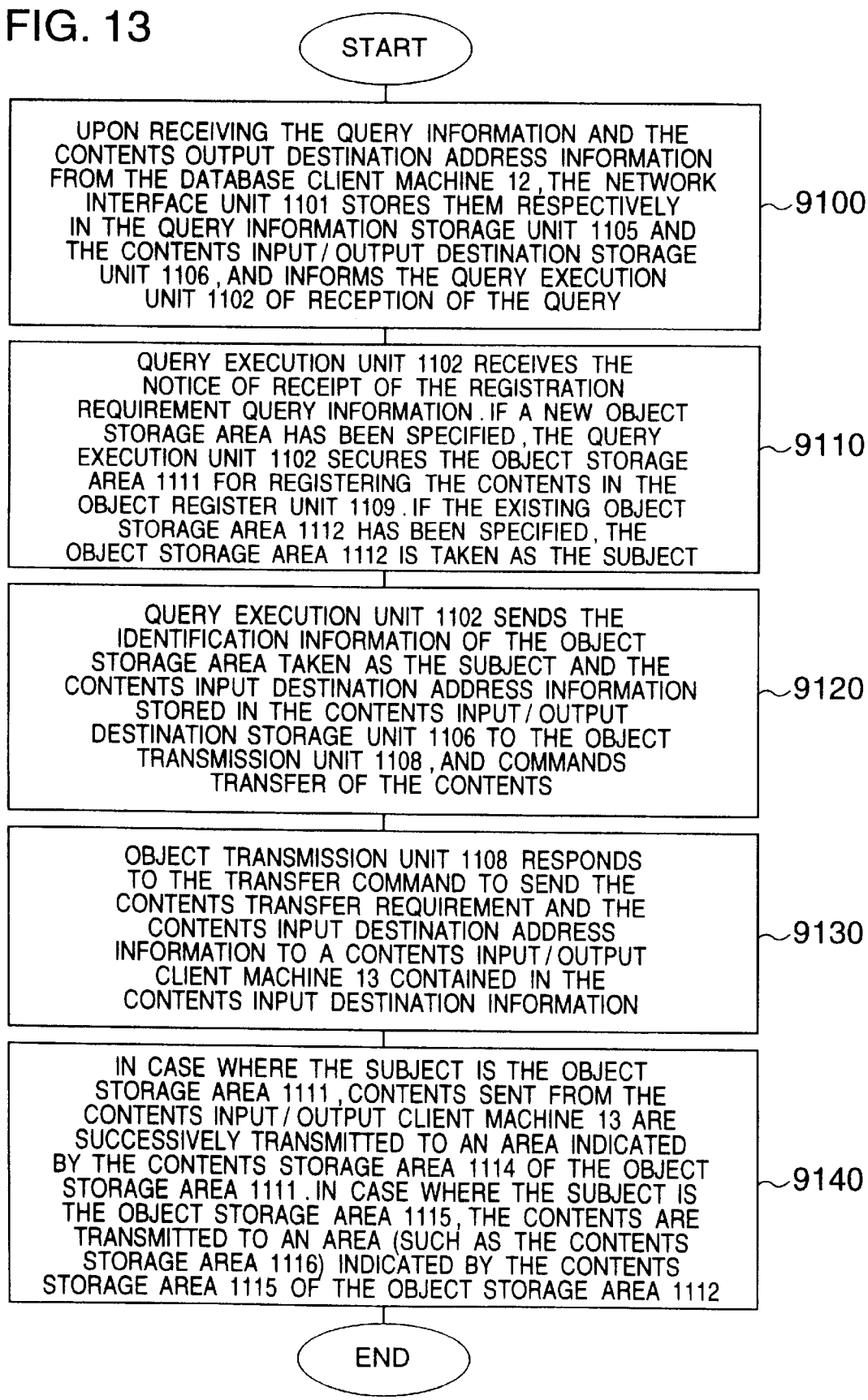
FIG. 13 is a diagram showing a flow chart of registration operation of a database server machine 11.

Registration operation of the database server machine 11 will now be described by referring to FIG. 13.

First of all, registration operation is started from an operation block 9100.

Upon receiving the query information and the contents output destination address information from the database client machine 12 in the operation block 9100, the network interface unit 1101 stores them respectively in the query information storage unit 1105 and the contents input/output destination storage unit 1106, and informs the query execution unit 1102 of reception of the query. Then operation of an operation block 9110 is started.

In the operation block 9110, the query execution unit 1102 receives the notice of receipt of the registration requirement query information. If a new object storage area has been specified, the query execution unit 1102 secures the object storage area 1111 for registering the contents in the object register unit 1109.

If an existing object storage area 1112 has been specified, operation of an operation block 9120 is started by taking the object storage area 1112 as the subject.

In the operation block 9120, the query execution unit 1102 sends the identification information of the object storage area taken as the subject and the contents input destination address information stored in the contents input/output destination storage unit 1106 to the object transmission unit 1108, and commands transfer of the contents. Then operation of an operation block 9130 is started.

In the operation block 9130, the object transmission unit 1108 responds to the transfer command to send the contents transfer requirement and the contents input destination address information to a contents input/output client machine 13 contained in the contents input destination information. Then operation of an operation block 9140 is started.

In the case where the subject is the object storage area 1111 in the operation block 9140, contents sent from the contents input/output client machine 13 are successively transmitted to an area indicated by the contents storage area 1114 of the object storage area 1111. In the case where the subject is the object storage area 1112, the contents are transmitted to an area (such as the contents storage area 1116) indicated by the contents storage area 1115 of the object storage area 1112. The registration operation is thus finished.

Figure 14:
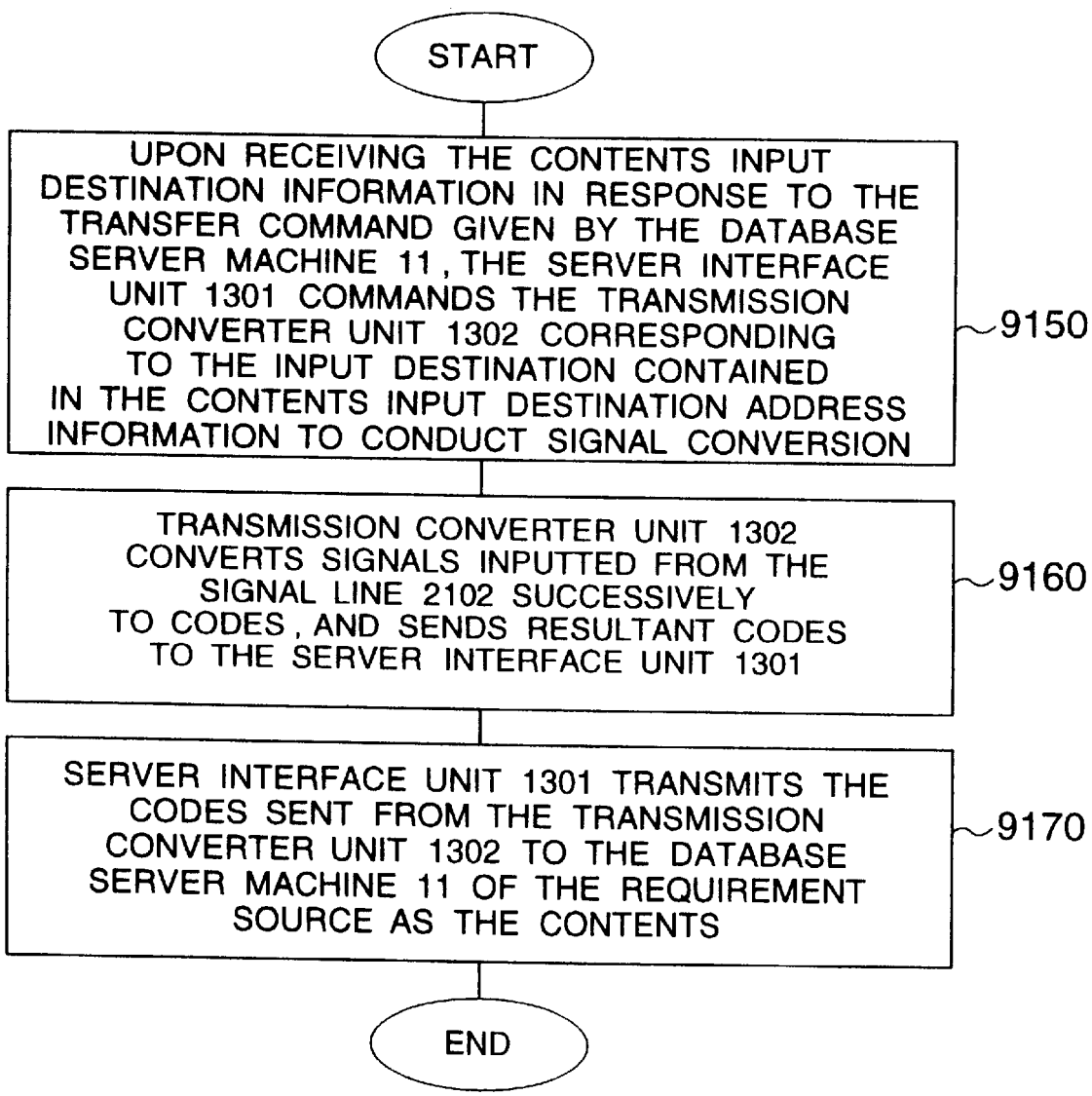
FIG. 14 is a diagram showing a flow chart of registration operation of a contents input/output client machine 13.

Registration operation of the contents input/output client machine 13 will now be described by referring to FIG. 14.

First of all, the registration operation is started from an operation block 9150.

Upon receiving the contents input destination information in response to the transfer command given by the database server machine 11 in the operation block 9150, the server interface unit 1301 commands the transmission converter unit 1302 corresponding to the input destination contained in the contents input destination address information to conduct signal conversion. Then operation of an operation block 9160 is started.

In the operation block 9160, the transmission converter unit 1302 converts signals inputted from the signal line 2102 successively to digital codes, and sends resultant digital codes to the server interface unit 1301. Then operation of an operation block 9170 is started.

In the operation block 9170, the server interface unit 1301 transmits the codes sent from the the transmission converter unit 1302 to the database server machine 11 of the requirement source as the contents. The registration operation is thus finished.

(c) Query Gateway Operation

Hereafter, description will be given by taking, as an example, the case where the storage area handled as the result of the query is not in the database server machine 11 to which the database client machine 12 has sent the query, but is in the database storage unit 2204 of the database server machine 22.

At this time, operation of the database server machine 22 may be identical with that of the database server machine 11 described by referring to FIGS. 9 through 14. Therefore, description thereof will be omitted. Hereafter, gateway operations of retrieval and registration of the database server machine 11 will be described, respectively.

Figure 15:
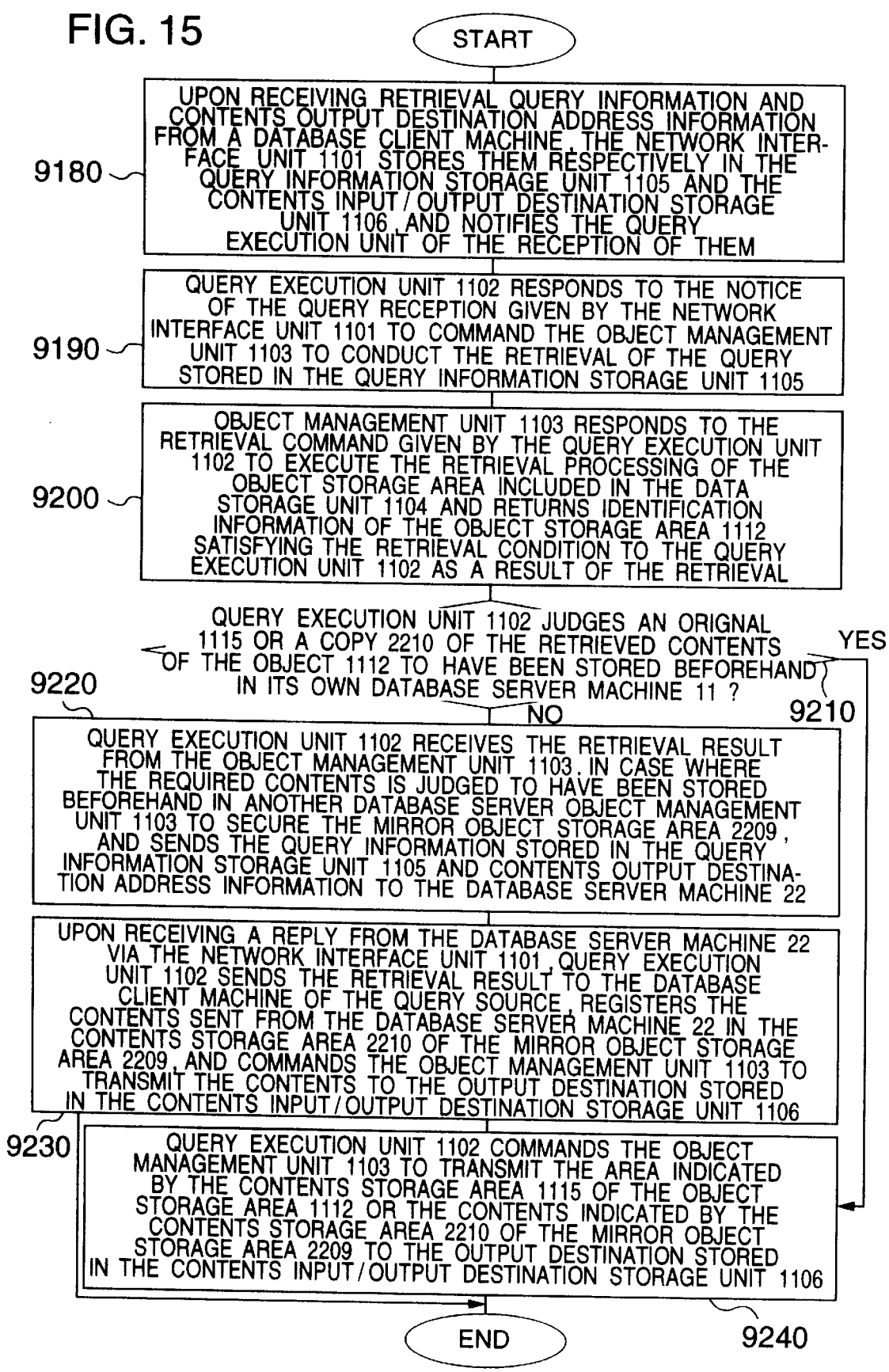
FIG. 15 is a diagram showing a flow chart of retrieval gateway operation of a database server machine 11.

The retrieval gateway operation of the database server machine 11 will now be described by referring to FIG. 15. First of all, the retrieval gateway operation is started from an operation block 9180.

Upon receiving retrieval query information and contents output destination address information from a database client machine in the operation block 9180, the network interface unit 1101 stores them respectively in the query information storage unit 1105 and the contents input/output destination storage unit 1106, and notifies the query execution unit of the reception of them. Then operation of an operation block 9190 is started.

In the operation block 9190, the query execution unit 1102 responds to the notice of the query reception given by the network interface unit 1101 to command the object management unit 1103 to conduct the retrieval indicated by the query stored in the query information storage unit 1105. Then operation of an operation block 9200 is started.

In the operation block 9200, the object management unit 1103 responds to the retrieval command given by the query execution unit 1102 to execute the retrieval processing of the object storage area included in the data storage unit 1104 and returns identification information of the object storage area 1112 satisfying the retrieval condition to the query execution unit 1102 as a result of the retrieval. Then operation of an operation block 9210 is started.

In the operation block 9210, the query execution unit 1102 enters operation of an operation block 9240 if an original 1115 or a copy 2210 of the retrieved contents of the object 1112 is judged to have been stored beforehand in its own database server machine 11. If it is judged not to have been stored beforehand, the query execution unit 1102 enters operation of an operation block 9220.

In the operation block 9220, the query execution unit 1102 receives the retrieval result from the object management unit 1103. In the case where the required contents is judged to have been stored beforehand in another database server machine 22, the query execution unit 1102 commands the object management unit 1103 to secure the mirror object storage area 2209, and sends the query information stored in the query information storage unit 1105 and its own database server machine 11 functioning as the contents output destination address information to the database server machine 22. Then operation of an operation block 9230 is started.

Upon receiving a reply from the database server machine 22 via the network interface unit 1101 in the operation block 9230, the query execution unit 1102 sends the retrieval result to the database client machine of the query source, stores the contents sent from the database server machine 22 in the contents storage area 2210 of the mirror object storage area 2209, and commands the object management unit 1103 to transmit the contents to the output destination stored in the contents input/output destination storage unit 1106. The retrieval gateway operation is thus finished.

In an operation block 9240, the query execution unit 1102 commands the object management unit 1103 to transmit the area indicated by the contents storage area 1115 of the object storage area 1112 or the contents indicated by the contents storage area 2210 of the mirror object storage area 2209 to the output destination stored in the contents input/output destination storage unit 1106. The retrieval gateway operation is thus finished.

If in the foregoing description the user applies the operation to a system using the same contents with low frequency, the contents of the contents input/output destination storage unit 1106 may be sent to the database server machine 22 as the contents input/output destination address in the operation blocks 9220 and 9230. At this time, the database server machine 11 does not intercede in contents transmission, but intercedes only in the query reply.

The registration gateway operation of the database server machine 11 will now be described by referring to FIG. 16. First of all, the registration gateway operation is started from an operation block 9250.

Upon receiving registration query information and contents output destination address information from the database client machine 12 in the operation block 9250, the network interface unit 1101 stores them respectively in the query information storage unit 1105 and the contents input/output destination storage unit 1106, and notifies the query execution unit 1102 of reception of them. Then operation of an operation block 9260 is started.

In the operation block 9260, the query execution unit 1102 responds to the notice of the query reception given by the network interface unit 1101 to command the object management unit 1103 to conduct the retrieval indicated by the query stored in the query information storage unit 1105. Then operation of an operation block 9270 is started.

In the operation block 9270, the object management unit 1103 responds to the retrieval command given by the query execution unit 1102 to execute the retrieval processing of an object storage area included in the data storage unit 1104 and returns identification information of the object storage area 1112 satisfying the retrieval condition to the query execution unit 1102 as the retrieval result. Then operation of an operation block 9280 is started.

If in the operation block 9280 the original 1112 of the needed object storage area is judged to have been stored beforehand in the data storage unit 1104 of its own database server machine 11, the query execution unit 1102 enters operation of an operation block 9310. Otherwise, the query execution unit 1102 enters operation of an operation block 9290.

If there is the mirror object storage area 2209 in the operation block 9290, the query execution unit 1102 commands the object management unit 1103 to delete the mirror object storage area 2209, sends the query information stored in the query information storage unit 1105 and contents stored in the contents input/output destination storage unit 1106 functioning as the contents output destination information to the database server machine 22 via the network interface unit 1101, and conducts query gateway operation. Then the query execution unit 1102 enters operation of an operation block 9300.

Upon receiving a reply from the database server machine 22 via the network interface unit 1101 in the operation block 9300, the query execution unit 1102 sends the retrieval result to the database client machine 12 of the query source. The registration gateway operation is thus finished.

In the operation block 9310, the query execution unit 1102 commands the object management unit 1103 to transmit the contents sent from the machine 13 of contents input destination stored in the contents input/output destination storage unit 1106 to the contents storage areas 1115 of the object storage area 1112, respectively. The registration gateway operation is thus finished.

(2) Example of Application

An example of application of the present multimedia database management system to a television station will now be described by referring to FIGS. 4 through 8.

Components of a television station are generally described in "Introduction to television station equipments" written by Genzaburo Kuraishi and published by Tokyo Electric University Publication and "Television program production technique, from foundation to know-how" written by Toshio Morita and published by Kenrokukan Publication. Therefore, the components of a television station will not be described here.

(a) Components of System

Figure 4:
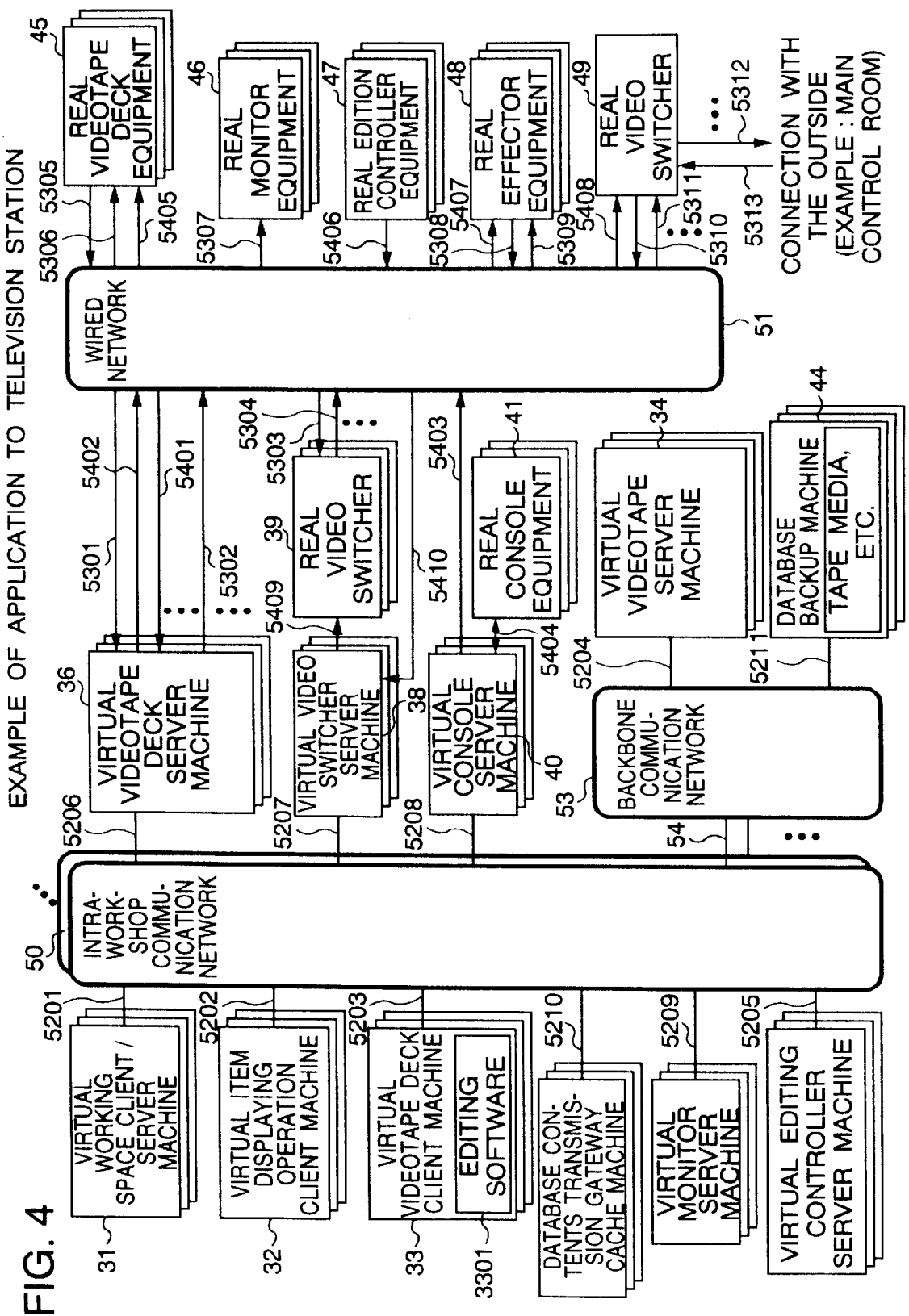
FIG. 4 is a diagram showing an example of the application to a television station.

Components of the system will now be described by referring to FIG. 4. However, all of the components hereafter described are not needed simultaneously, but a part thereof sufficient to provide the function needed by the user may be used.

A backbone communication network 53 connects components shared by the whole system and components disposed in respective workshops, such as a sub-control room, via a plurality of intra-communication networks 50 for connection in respective workshops, a data path 54, a data path 5204, and a data path 5211 to effect mutual communication.

Especially if the data path 54 for connecting the backbone communication network 53 to the intra-workshop communication networks 50 is implemented by a router equipment for letting flow data selectively, for example, the traffic volume of the whole network can be reduced. Furthermore, in a small scale system, the communication networks 50 and 53 may be formed by a single communication network.

A virtual videotape server machine 34 functions as a database server machine, and it is connected to the backbone communication network 53 via the data path 5204. The virtual videotape server machine 34 stores video information shared by the whole station. Video information is managed as contents, and an object having one or more contents is managed as virtual videotape.

A database backup machine 44 is an external memory for backing up data stored in virtual videotape server machines 34 by using a medium, such as magnetic tape, which is excellent in preservation performance and low in cost. The database backup machine 44 is connected to the backbone communication network 53 via the data path 5211.

A database contents transmission gateway cache machine 43 functions as a database server machine. In particular, the database contents transmission gateway cache machine 43 mainly conducts query gateway operation. The database contents transmission gateway cache machine 43 is connected to the intra-workshop communication network 50 via the data path 5210. There is no harm even if video information shared and used only within workshops is registered in this database contents transmission gateway cache machine 43.

A virtual item displaying operation client machine 32 functions as a database client machine, and it is connected to the intra-workshop communication network 50 via the data path 5202. Retrieval conducted from the virtual item displaying operation client machine 32 is retrieval of virtual videotape containing contents needed by the user.

A virtual working space client/server machine 31 functions as both a database client machine and a database server machine. It is connected to the intra-workshop communication network 50 via the data path 5201. In particular, the virtual working space client/server machine 31 is used to register/use the current utilization environment of the user.

A virtual videotape deck server machine 36 functions as a contents input/output client machine. It is connected to the intra-workshop network 50 via the data path 5206. A signal line 5301 is used for its video signal input. A signal line 5402 is used for its video signal output. As for the video signal input/output, the virtual videotape deck server machine 36 receives a device control signal from a real video editing equipment, for example, via a control signal line 5401. Furthermore, a device control signal to be supplied to another equipment is outputted via a control signal line 5302. For each virtual videotape, the virtual videotape deck server machine 36 provides the service of a virtual videotape deck for recording/reproducing images.

A virtual videotape deck client machine 33 is a computer. It functions so as to make video information of the virtual videotape server 36 and the database contents transmission gateway cache machine 43 capable of being treated as a file. The virtual videotape deck client machine 33 is connected to the intra-workshop communication network 50 via a data path 5203. In particular, it utilizes video editing software.

A virtual monitor server machine 42 functions as a database input/output client machine. It is connected to the intra-workshop communication network 50 via a data path 5207. In particular, signal input is not conducted. Its output signal is displayed on a display monitor.

A virtual video switcher server machine 38 is connected to the intra-workshop communication network 50 via a data path 5207. In response to a command sent via the intra-workshop communication network 50 or a device control signal inputted thereto via a control signal line 5410, the virtual video switcher server machine 38 controls a real video switcher 39 connected thereto via a control signal line 5409.

Hereafter, a term "real" means that the equipment is not a function module virtually implemented by a program on a computer, but the equipment itself is independent as an equipment.

A virtual console server machine 40 is connected to the intra-workshop communication network 50 via a data path 5208. In response to a command inputted thereto via the intra-workshop communication network 50, the virtual console server machine 40 controls a real console equipment (console) 41 connected thereto via a control signal line 5404. In addition, the virtual console server machine 40 sends command information given to the real console equipment directly by the user to a control signal line 5403 or the intra-workshop communication network 50.

A virtual editing controller server machine 35 is connected to the intra-workshop communication network 50 via a data path 5205. In response to a command given by the user, the virtual editing controller server machine 35 controls the virtual videotape deck server machine 36 and the virtual video switcher server machine 38, and commands video editing.

A wired network 51 conducts one-to-one connection on signal lines 5301, 5402, 5303, 5304, 5305, 5306, 5307, 5308, 5309, 5310, 5311 and so on, and conducts one-to-one connection on control signal lines 5401, 5302, 5410, 5403, 5405, 5406, 5407, 5408 and so on.

Furthermore, a real videotape deck equipment 45, a real monitor equipment (such as a TV monitor equipment) 46, a real edition controller equipment 47, a real effector equipment 48, and a real video switcher 49 are connected to the wired network 51. The real video switcher 49 is connected to signal lines 5312 and 5313. Especially in a television station, these signal lines are connected to a main control room.

(b) Screen Manipulation Procedure

A virtual item displaying operation client machine 32 and the manipulation procedure thereof on the screen will now be described.

(Explanation of manipulation of virtual videotape server)

Figure 5:
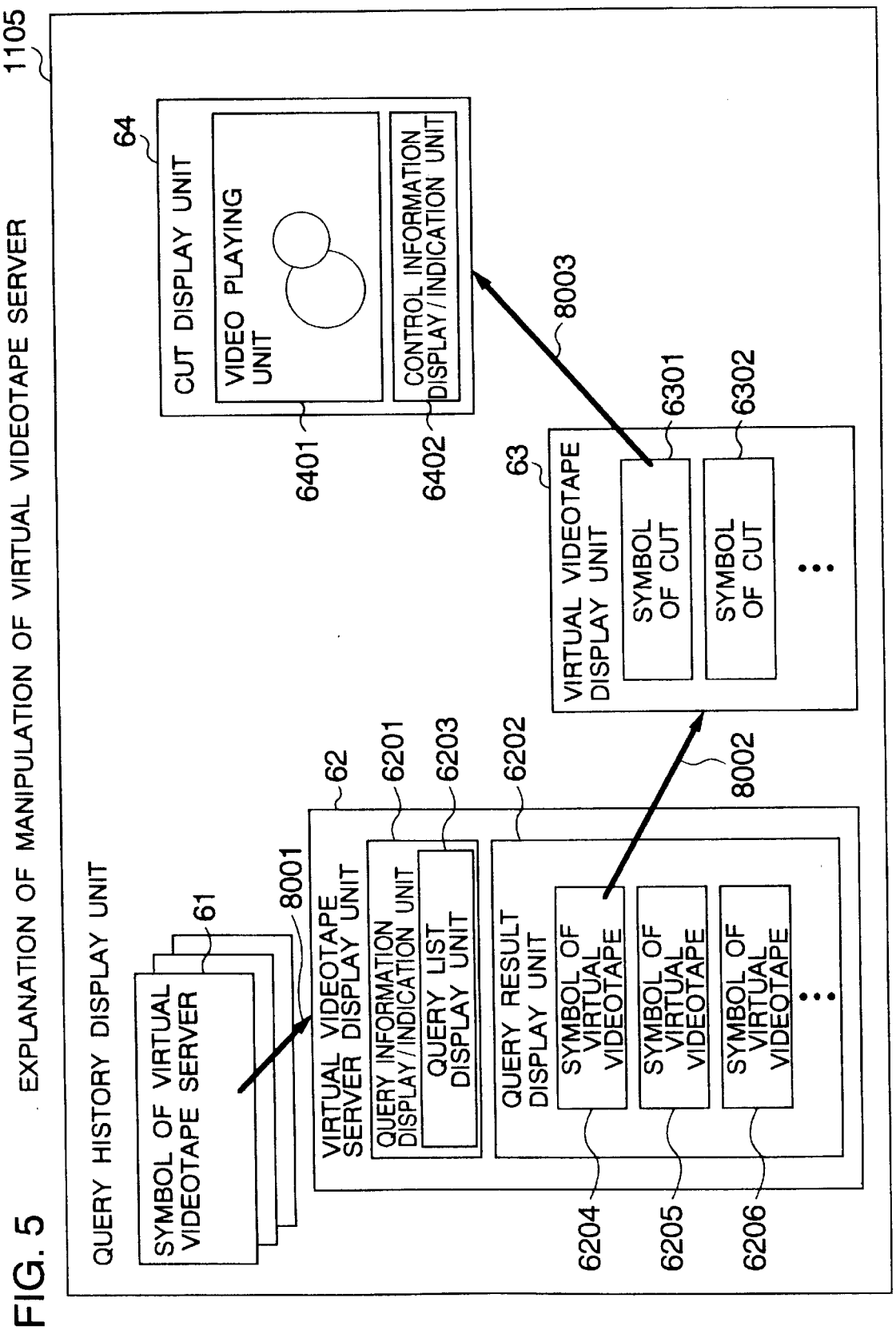
FIG. 5 is a diagram for an explanation of manipulation of a virtual videotape server.

Manipulation of the virtual videotape server will now be described by referring to FIG. 5. Description will be given by using the screen of the query history display unit 1105. In FIG. 5, arrows 8001, 8002 and 8003 schematically indicate relations of cause and effect.

First of all, a symbol 61 of the virtual videotape server is displayed. If the user requires details of the symbol 61, a virtual videotape server display unit 62 is displayed.

The virtual videotape server display unit 62 includes a query information display/indication unit 6201 for displaying a query commanded by the user and a query result display unit 6202 for displaying a list of query results.

The query information display/indication unit 6201 includes a query list display unit 6203 for displaying a list of queries conducted by the user in the past. If a query is commanded out of the list, past retrieval results are displayed on the query result display unit 6202.

The query result display unit 6202 displays symbols 6204, . . . , 6206, . . . of virtual videotape containing contents which satisfy the retrieval condition as a result of a query conducted by the user.

If the user requires, for example, details of the symbol 6204 of the virtual videotape, a virtual videotape display unit 63 is displayed. For cuts (video information) contained in the virtual videotape thereof, the virtual videotape display unit 63 includes symbols 6301, 6302, . . . of respective representative cuts. The representative symbol of a cut may be a frame image contained in the cut, a still picture representing a feature, or simply a character string representing the title of the cut.

Furthermore, if the user requires details of the cut symbol 6301, a cut display unit 64 is displayed. The cut display unit 64 includes a video playing unit 6401 for playing and displaying a specified cut and a control information display/indication unit 6402 for indicating the cut playing control (such as playing and stopping). The cut display unit 64 conducts preview of a specified cut.

According to a requirement from the user, display of each display unit can be deleted.

(Explanation of manipulation of virtual videotape deck server)

Figure 6:
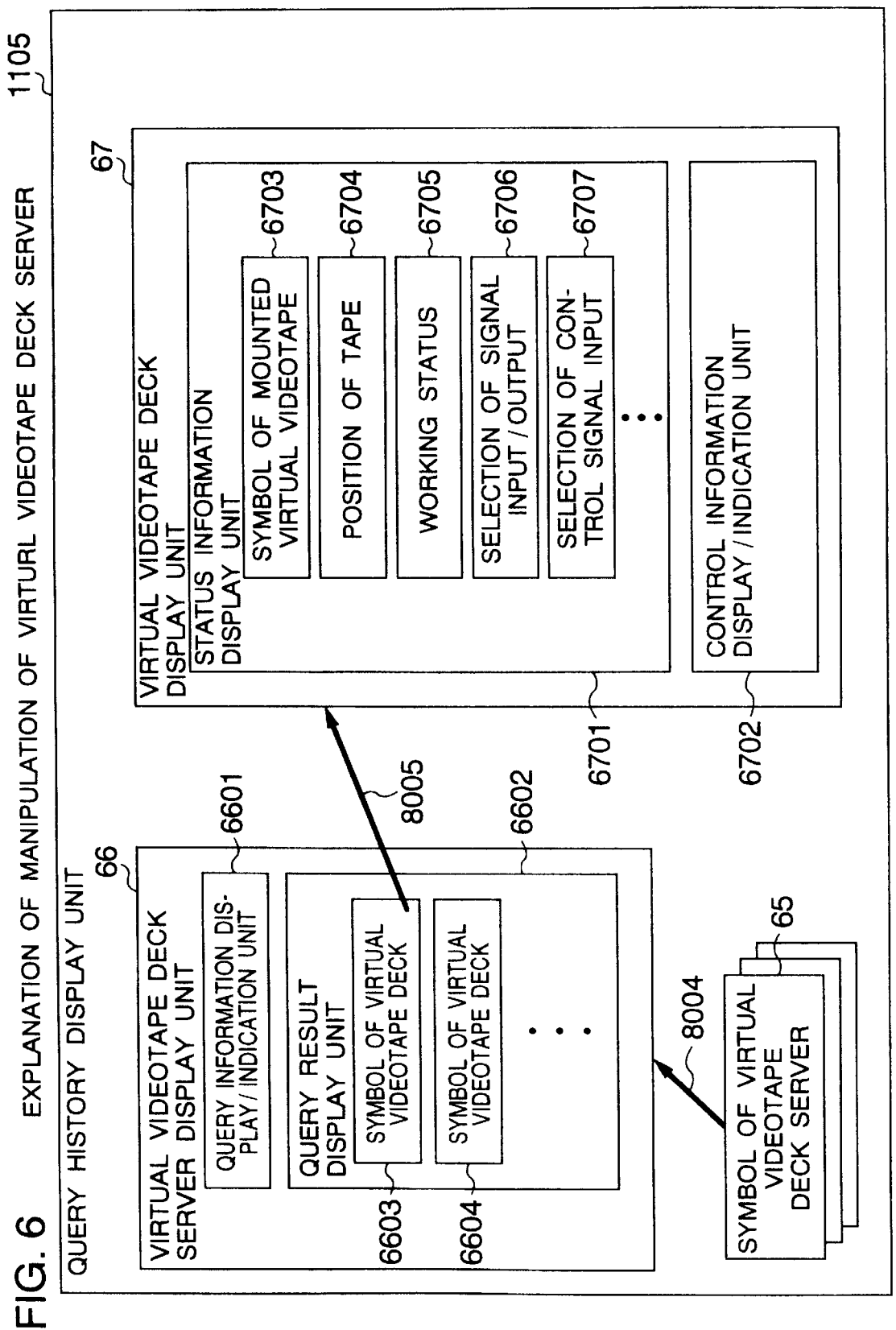
FIG. 6 is a diagram for an explanation of manipulation of a virtual videotape deck server.

Manipulation of the virtual videotape deck server will now be described by referring to FIG. 6. In FIG. 6, arrows 8004 and 8005 schematically indicate relations of cause and effect.

First of all, a symbol 65 of the virtual videotape deck server is displayed.

If the user requires details of the symbol 65, a virtual videotape deck server display unit 66 is displayed.

The virtual videotape deck server display unit 66 includes a query information display/indication unit 6601 for displaying information of a query commanded by the user and a query result display unit 6602 for displaying a list of query results.

The query result display unit 6602 displays symbols 6603, 6604, . . . of available virtual videotape decks.

If the user requires, for example, details of the symbol 6603 of the virtual videotape deck, a virtual videotape deck display unit 67 is displayed. Here, selection of the symbol of the virtual videotape deck is setting the contents input/output destination machine address. The virtual videotape deck display unit 67 includes a status information display unit 6701 for displaying the status of the virtual videotape deck and a control information display/indication unit 6702.

The status information display unit 6701 displays information such as a display 6703 indicating which virtual videotape is mounted on the virtual videotape deck represented by the virtual videotape deck symbol 6603, and a display 6706 indicating the connection destination of the played/recorded signal.

In the control information display/indication unit 6702, control (such as playing and stopping) of the virtual videotape deck is effected.

Figure 7:
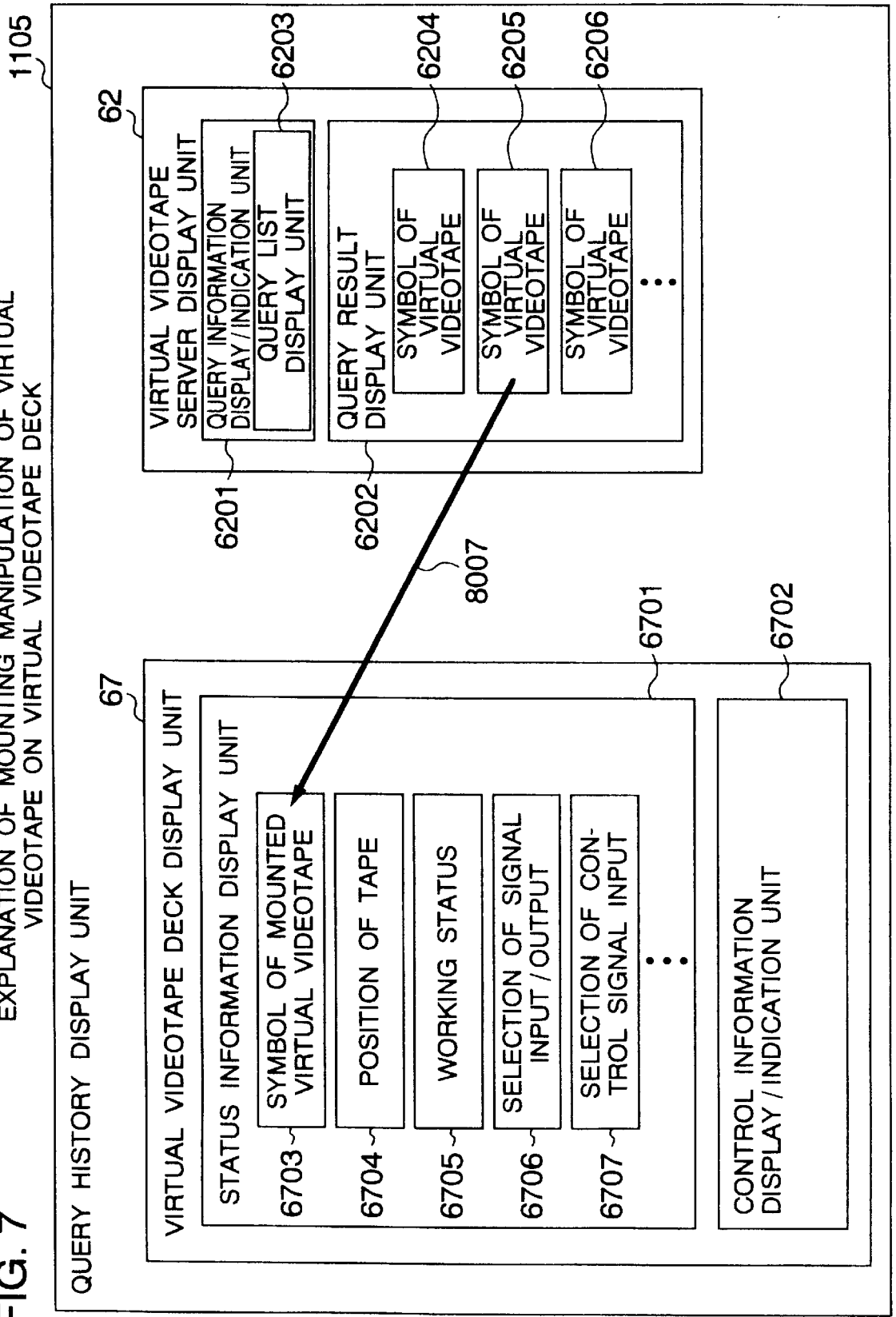
FIG. 7 is a diagram for an explanation of mounting manipulation of a virtual videotape on a virtual videotape deck.

Manipulation for mounting virtual videotape on a virtual videotape deck will now be described by referring to FIG. 7. In FIG. 7, an arrow 8007 schematically shows dragging the symbol 6205 to the virtual videotape deck display unit 67 with a pointing device, for example.

By dragging the symbol 6205 of the virtual videotape of the already displayed virtual videotape server display unit 62 to the already displayed virtual videotape deck display unit 67 with a pointing device, for example, the virtual videotape indicated by the symbol 6205 is mounted on the virtual videotape deck indicated by the virtual videotape deck display unit 67. If the virtual videotape is mounted, the symbol 6703 of the mounted videotape is displayed on the status information display unit 6701.

Figure 8:
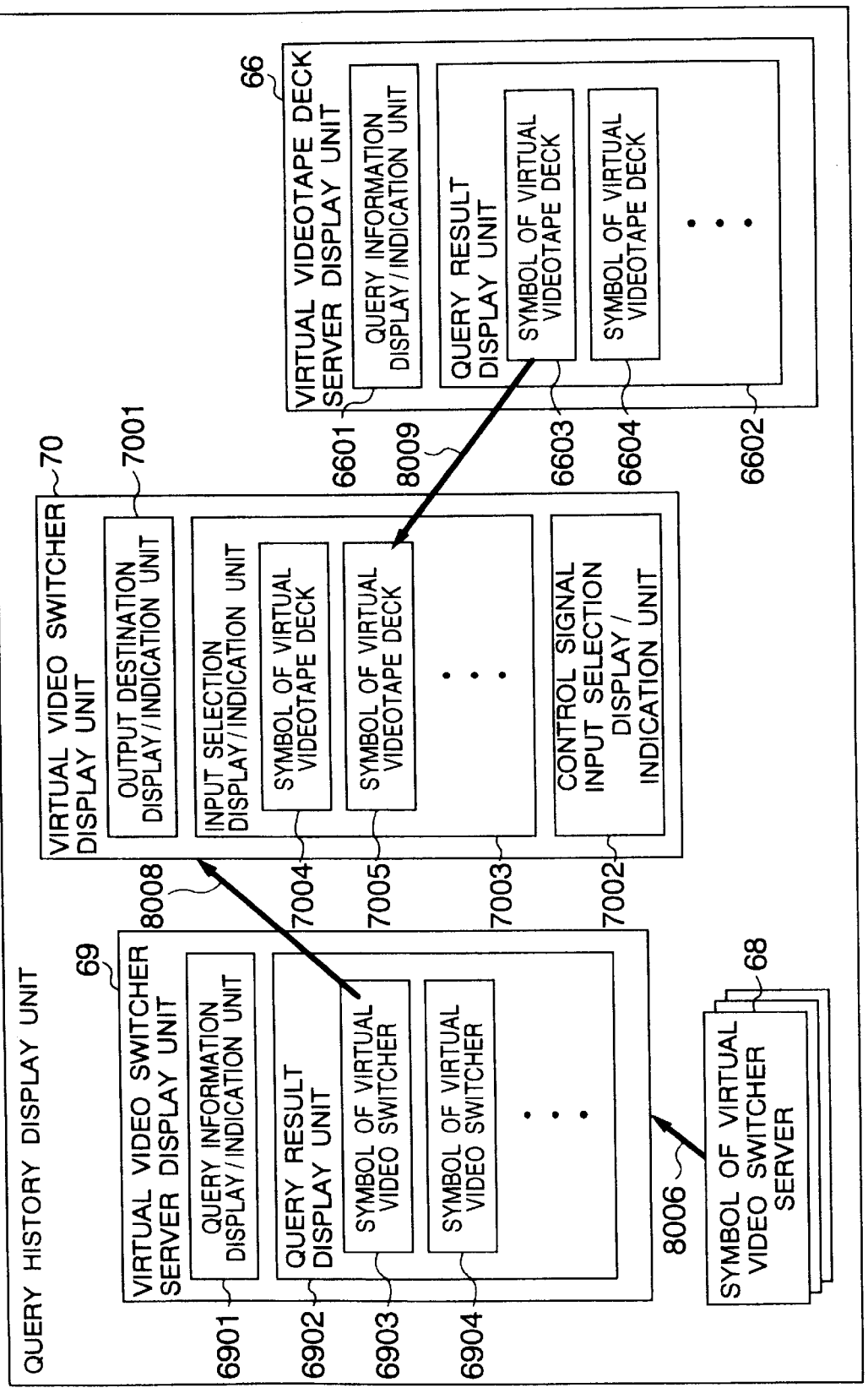
FIG. 8 is a diagram for an explanation of manipulation of a virtual video switcher.

Manipulation of the virtual video switcher will now be described by referring to FIG. 8.

First of all, a symbol 68 of the virtual video switcher server is displayed. In FIG. 8, arrows 8006 and 8008 schematically indicate relations of cause and effect. Furthermore, an arrow 8009 schematically shows dragging the symbol 6603 to an input selection display/indication unit 7003 with a pointing device, for example.

If the user requires details of the symbol 68, a virtual video switcher server display unit 69 is displayed.

The virtual video switcher server display unit 69 includes a query information display/indication unit 6901 and a query result display unit 6902.

In the query result display unit 6902, symbols 6903, 6904, . . . of available virtual video switchers are displayed.

If the user requires details of the symbol 6903 of a virtual video switcher, a virtual video switcher display unit 70 is displayed.

The virtual video switcher display unit 70 includes an output destination display/indication unit 7001 for displaying/indicating where the output signal is outputted, an input selection display/indication unit 7003 for displaying a list of symbols of virtual items supplying input signals, and a control signal input selection display/indication unit 7002 for displaying where a control signal for controlling video switching should be received from.

By dragging the symbol 6603 of the virtual videotape deck to the input selection display/indication unit 7001 with a pointing device, for example, a connection of the virtual videotape deck to the virtual video switcher is set. Symbols 7004 and 7005 of already set virtual videotape decks are displayed in the input selection display/indication unit 7003. Selection of an input signal of the virtual video switcher is conducted by selecting one out of the symbols 7004, 7005, . . . displayed on the input selection display/indication unit. Or control of the selection of a video signal is conducted according to a control signal supplied from the control signal line 5410 specified in the control signal input selection display/ indication unit 7002.

The present invention makes it possible to store information of the retrieval condition and the retrieval result in a database, reuse results of retrieval operations conducted in the past, and reduce the load of the database server machine.

As for the transmission destination of contents caused by a query requirement, the user can specify a machine capable of handling the contents out of machines different from the machine issuing a query requirement. From a machine capable of handling the contents, therefore, the user can manipulate the contents of the retrieval result. For example, in the case where the contents of retrieval are video data, the user can specify a machine capable of playing the video data as the transmission destination.

We claim:

1. A multimedia database management system including a database client machine and a database server machine, said database client machine accepting a database query requirement from a user, said database server machine storing and managing a collection of data to be subjected to processing of a database query requirement and identification information functioning as data for referring to said data in a database as an object, said database server machine functioning to return identification information of an object containing data satisfying a query condition to said database client machine in response to processing of a database query requirement set out by the database client machine, said database client machine being connected to said database server machine via a communication network, wherein said database server machine comprises means for generating an object containing contents of a database query requirement and a query result at time of processing a database query requirement and for registering the object in said database; and wherein said database client machine comprises means responsive to information of a new query requirement to require said database server machine to retrieve an object containing contents of a database query requirement already conducted and its query result and receive a query result for a database query requirement already conducted squaring with the information of said new query requirement as a query result.

2. A multimedia database management system comprising:

a communication network;

a database client machine connected to said communication network, a database query requirement from a user being inputted to said database client machine;

a database server machine connected to said communication network, said database server machine storing and managing a collection of data to be subjected to processing of a database query requirement received from said database client machine; and contents input/output client machine connected to said communication network to receive data obtained as a result of the processing of said database query requirement from said database server machine and convert the data to a played signal to be outputted to an output equipment.

3. A multimedia database management system comprising:

a communication network;

a database client machine connected to said communication network to accept a database query requirement from a user;

a database server machine connected to said communication network, said database server machine storing and managing a collection of data to be subjected to processing of a database query requirement; and contents input/output client machine connected to said communication network, said contents input/output client machine converting an input signal inputted from an input equipment so as to be stored in said database server machine to data of such a form as to be stored in said database server machine and transmitting resultant data to said database server machine.

4. A multimedia database management system comprising:

a communication network;

a database client machine connected to said communication network to accept a database query requirement from a user;

a database server machine connected to said communication network, said database server machine storing and managing a collection of data to be subjected to processing of a database query requirement; and contents input/output client machine connected to said communication network to receive data obtained as a result of the processing of said database query requirement from said database server machine and convert the data to a played signal to be outputted to an output equipment, said contents input/output client machine converting an input signal inputted from an input equipment so as to be stored in said database server machine to data of such a form as to be stored in said database server machine and transmitting resultant data to said database server machine.

5. A multimedia database management system including a database client machine and a database server machine, said database client machine accepting a database query requirement from a user, said database server machine storing and managing a collection of data to be subjected to processing of the database query requirement and data for referring to said data in a database as an object, said database server machine functioning to return identification information of an object containing data satisfying a query condition to said database client machine, said database client machine being connected to said database server machine via a communication network, said multimedia database management system comprising:

a contents input/output client machine connected to said database server machine via the communication network;

an input/output equipment connected to said contents input/output client machine;

means responsive to reception, from the database server machine, of a transmission requirement of data contained in an object of a retrieval result or data contained in an object to be registered, to send and receive said data from said database server machine to said input/output equipment or from said input/output equipment to said database server machine;

means provided in said database client machine so as to function to send a machine address of said contents input/output client machine whereto data of a retrieval result should be transmitted or a machine address of said contents input/output client machine which should transmit data to be registered to said database server machine, to said database server machine together with a database query or a registration requirement; and means provided in said database server machine so as to function to send said transmission requirement of a result of processing of a database query requirement or data to be registered into the database to said contents input/output client machine indicated by said machine address sent from said database client machine, and send/recieve receive said data to/from said contents input/output client machine.

6. A database server machine for storing and managing data to be subjected to processing of a database query requirement and a collection of identification information data for referring to said data in a database as an object, wherein in processing of a database query requirement from a connected database client machine, said database server machine sends identification information of an object containing data satisfying a query condition to said database client machine;

wherein said database server machine comprises means for generating an object containing contents of a database query requirement and a query result at time of processing a database query requirement and for registering the object in said database; and wherein said database server machine comprises means responsive to information of a new query requirement to accept a retrieval request of an object containing contents of a database query requirement already conducted and its query result and send out a query result for a database query requirement already conducted squaring with the information of said new query requirement as a query result.

7. A data manipulation method comprising the steps of:

storing and managing data to be subjected to processing of a database query requirement and a collection of identification information data for referring to said data in a database as an object;

in processing of a database query requirement from a connected database client machine, sending identification information of an object containing data satisfying a query condition to said database client machine;

generating an object containing contents of a database query requirement and a query result at time of processing a database query requirement and for registering the object in said database; and in response to information of a new query requirement, accepting a retrieval request of an object containing contents of a database query requirement already conducted and its query result and sending out a query result for a database query requirement already conducted squaring with the information of said new query requirement as a query result.

* * * * *